United States Patent [19]

Adams

[11] 4,270,397
[45] Jun. 2, 1981

[54] ROTATABLE SLEEVE RACK

[75] Inventor: Frederick J. Adams, Clevedon, England

[73] Assignee: Cam Gears Limited, Hitchin, England

[21] Appl. No.: 886,142

[22] Filed: Mar. 13, 1978

[51] Int. Cl.³ .................. F16H 27/02; F16H 1/04; B62D 1/20
[52] U.S. Cl. .................. 74/89.18; 74/422; 74/498; 280/96
[58] Field of Search .............. 280/96, 95 R; 74/498, 74/422, 393, 89.18

[56] References Cited

U.S. PATENT DOCUMENTS

| 961,865 | 6/1910 | Kleinhan | 74/422 |
|---|---|---|---|
| 3,064,489 | 11/1962 | Deprez et al. | 74/422 X |
| 3,338,140 | 8/1967 | Sheesley | 74/422 X |
| 3,500,699 | 3/1970 | Matsuda | 74/498 |
| 3,546,957 | 12/1970 | Adams | 280/96 X |
| 3,592,075 | 7/1971 | Clark | 74/498 |
| 3,753,375 | 8/1973 | Colletti | 74/498 |
| 3,777,589 | 12/1973 | Adams | 280/96 |
| 3,788,159 | 1/1974 | Plant | 74/422 |
| 3,945,260 | 3/1976 | Horvath et al. | 74/498 X |
| 3,972,248 | 8/1976 | Adams | 74/498 |
| 3,983,763 | 10/1976 | Adams | 74/393 |

FOREIGN PATENT DOCUMENTS

| 1075959 | 2/1960 | Fed. Rep. of Germany | 74/498 |
|---|---|---|---|
| 2223527 | 11/1972 | Fed. Rep. of Germany | 74/498 |
| 609358 | 9/1948 | United Kingdom | 74/498 |
| 1000594 | 8/1965 | United Kingdom | 74/498 |

Primary Examiner—Leslie Braun
Attorney, Agent, or Firm—Yount & Tarolli

[57] ABSTRACT

An improved variable ratio steering apparatus is used to effect turning movement of steerable wheels of a vehicle. The apparatus includes a longitudinally extending force transmitting member or bar which is connected with the steerable vehicle wheels. A drive member is rotatably mounted on the bar. In order to effect axial movement of the bar and turning movement of the vehicle wheels, a pinion gear is disposed in meshing engagement with an array of helical rack gear teeth on the drive member. A cam track is also provided on the drive member. This cam track is coextensive with the array of rack gear teeth. The cam track cooperates with a follower to effect rotational movement of the drive member as the drive member and force transmitting bar are moved axially. This rotational movement of the drive member causes an interaction between the pinion and rack gear teeth to vary the rate of axial movement of the drive member and the force transmitting bar. The follower advantageously engages the cam track at a location which is axially aligned with the location where the pinion gear is disposed in meshing engagement with the rack gear teeth. This tends to minimize deflection of the components of the steering apparatus. Although an apparatus constructed in accordance with the present invention is advantageously used to turn the steerable wheels of a vehicle, it is also contemplated that the apparatus can be used in other environments.

5 Claims, 6 Drawing Figures

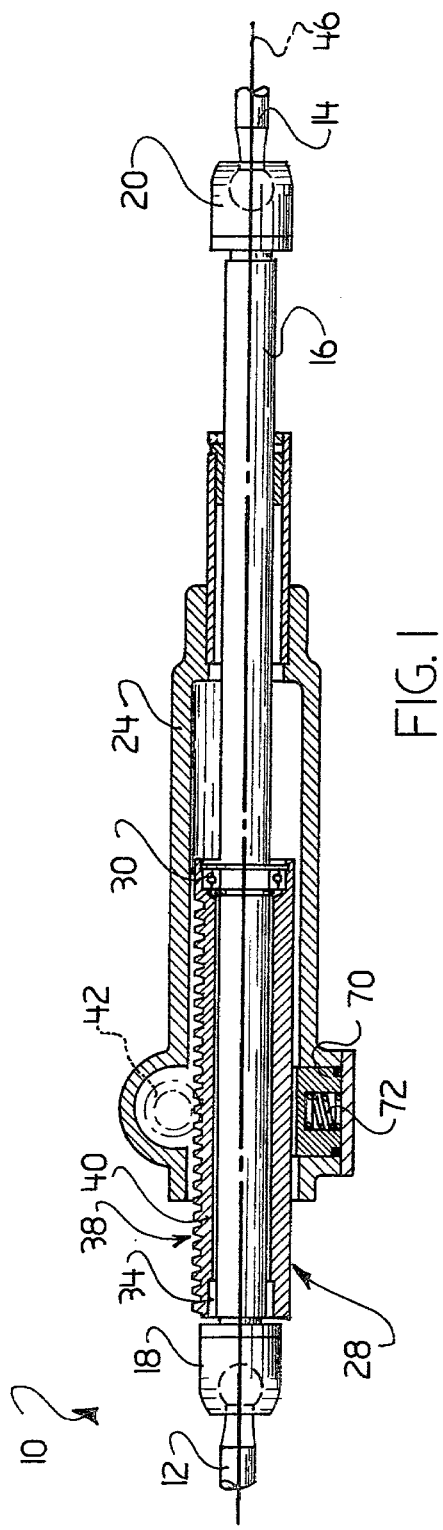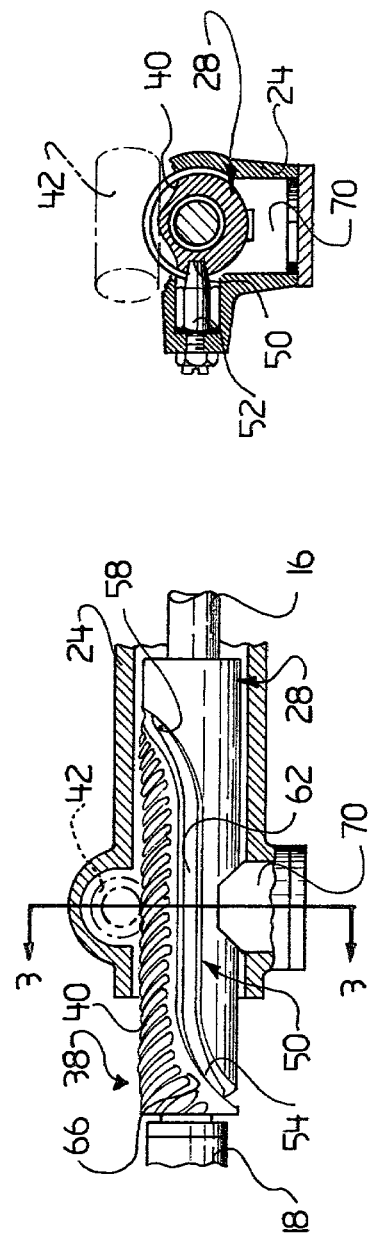

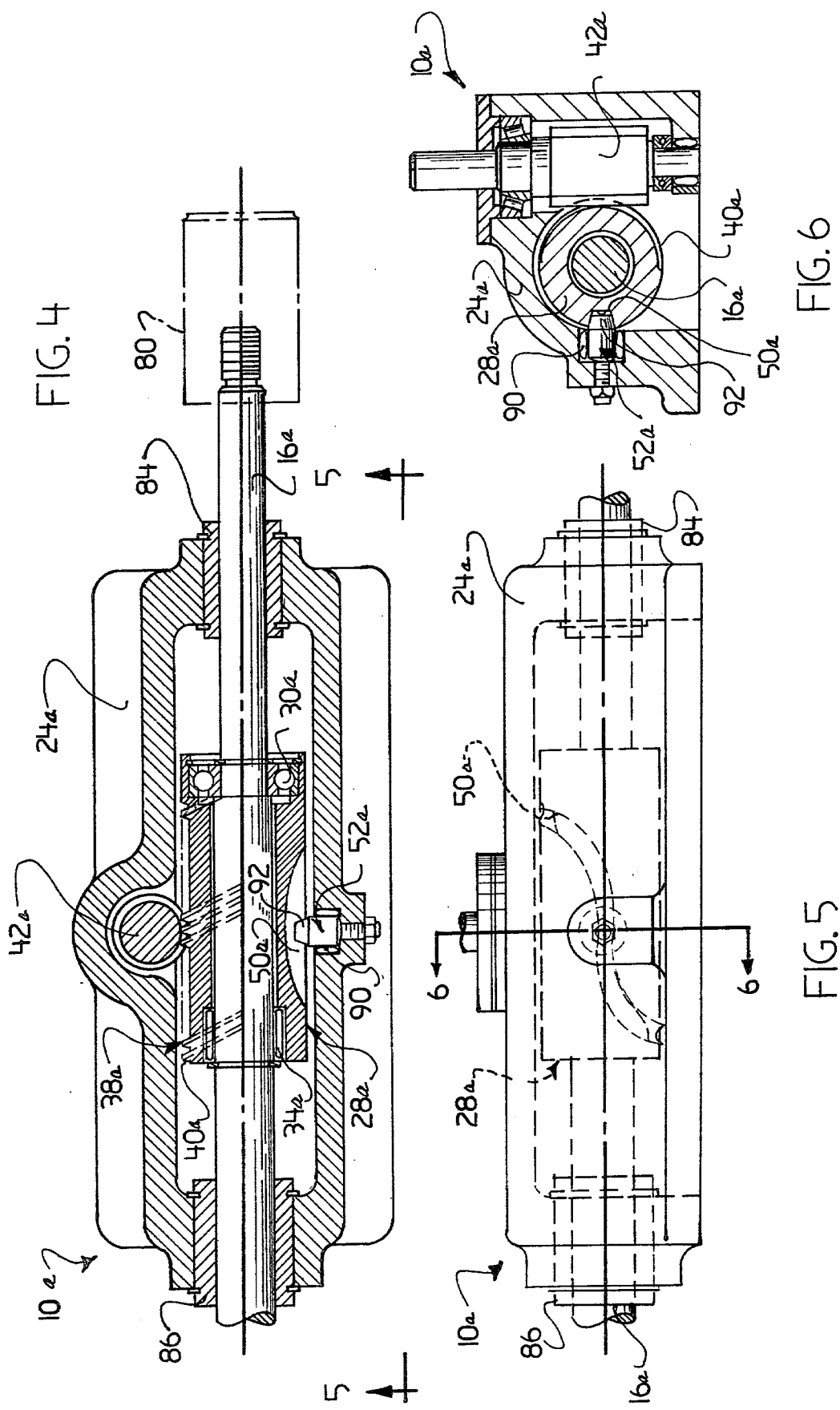

ROTATABLE SLEEVE RACK

BACKGROUND OF THE INVENTION

This invention relates generally to a force transmitting apparatus and more specifically to a force transmitting apparatus which is advantageously utilized to effect turning movement of a steerable wheel of a vehicle.

A known variable ratio steering apparatus is disclosed in U.S. patent application Ser. No. 868,114 filed Jan. 9, 1978 by Frederick John Adams and Ralph Malcolm Lehman and entitled "Rack And Pinion Assemblies". The steering apparatus disclosed in that application includes a pinion having teeth which mesh with helical gear teeth on a rack bar. The rack bar is displaced longitudinally relative to a housing upon rotation of the pinion. A cam track is disposed on the rack bar and is engaged by a follower which is connected with the housing. The cam track and follower cooperate to effect rotation of the rack bar upon longitudinal movement of the rack bar. This rotation of the rack bar causes the rack gear teeth and pinion gear teeth to interact in such a manner as to vary the rate of axial movement of the rack bar.

Although the steering apparatus disclosed in the aforementioned application is believed to be generally satisfactory in its construction and mode of operation, it is believed that after extended usage, ball joints at opposite ends of the rack bar may tend to wear. This wear of the ball joints is, to some extent at the least, induced by the rotation of the rack bar.

In addition, the cam track of the steering apparatus disclosed in the aforementioned application is axially offset from the rack gear teeth. Therefore, the rack bar must have a minimum length which is at least twice as great as the length of the array of rack gear teeth. It is believed that this relatively long length may be objectionable if the steering apparatus is used with relatively small vehicles. In addition, by having the cam track axially offset from the rack gear teeth, the rack gear is subjected to both torsional and bending forces when the rack gear is rotated by the cam follower.

SUMMARY OF THE PRESENT INVENTION

The present invention relates to a new and improved variable ratio steering apparatus for use in turning a pair of steerable wheels of a vehicle. The apparatus includes a longitudinally extending force transmitting member or bar having opposite end portions which are connected with the wheels of the vehicle. A rotatable drive member is connected with the bar. An array of rack gear teeth on the drive member cooperate with a pinion gear which is rotatable to effect axial movement of both the drive member and the longitudinally extending bar to thereby turn the wheels of the vehicle.

Upon axial movement of the bar, the drive member is rotated to cause an interaction between the rack and pinion gear teeth. The interaction between the rack and pinion gear teeth varies the rate of axial movement of the drive member and bar to thereby vary the steering ratio. The drive member is rotated by the cooperation between a cam track formed on the drive member and a cam follower. The cam track is advantageously made coextensive with the array of rack gear teeth to promote compactness of construction.

Since the cam track and follower cooperate to rotate the drive member relative to the longitudinally extending bar, the bar is not rotated. This tends to minimize wear inducing forces at ball joints disposed at opposite ends of the bar. In addition, wear inducing forces on the steering apparatus tends to be minimized by having the follower engage the cam track at a location on the drive member which is axially aligned with the location where the pinion gear engages the rack gear teeth on the drive member.

Although an apparatus constructed in accordance with the present invention is advantageously utilized to turn the steerable wheels of a vehicle, it is contemplated that the apparatus could be utilized in other environments if desired. For example, the apparatus could be used to control the movement of a traverse slide of a machine tool.

Accordingly, it is an object of this invention to provide a new and improved steering apparatus having a rotatable drive member with an array of rack gear teeth, the drive member is rotatable under the influence of a follower which engages a cam track on the drive member and wherein, the cam track is axially coextensive with the array of rack gear teeth.

Another object of this invention is to provide a new and improved variable ratio steering apparatus having a force transmitting member which is connected at opposite end portions to steerable wheels of a vehicle and wherein a drive member is connected with the force transmitting member at a location between its opposite end portions, the drive member being rotatable to effect an interaction between rack and pinion gear teeth to vary the steering ratio.

Another object of this invention is to provide a new and improved force transmitting apparatus having a rotatable drive member with an array of rack gear teeth which cooperate with a pinion gear and wherein a cam track formed on the drive member is coextensive with the array of rack gear teeth.

BRIEF DESCRIPTION OF THE DRAWINGS

The foregoing and other objects and features of the present invention will become more apparent upon a consideration of the following description taken in connection with the accompanying drawings wherein:

FIG. 1 is a fragmentary sectional view of a variable ratio steering apparatus constructed in accordance with the present invention;

FIG. 2 is a fragmentary sectional view of a portion of the steering apparatus of FIG. 1 and illustrating the relationship between an array of rack gear teeth and a cam track disposed on a rotatable drive member;

FIG. 3 is a sectional view, taken generally along the line 3—3 of FIG. 2, and illustrating the relationship between the drive member and a pinion gear which is disposed in meshing engagement with the rack gear teeth, a cam follower which engages the cam track, and a support member which presses the rack gear teeth into engagement with the pinion gear;

FIG. 4 is a fragmentary sectional view, generally similar to FIG. 1, of an embodiment of the invention which is utilized in associated with a machine tool;

FIG. 5 is an elevational view, taken generally along the line 5—5 of FIG. 4 and depicting the relationship between a cam track on a rotatable drive member and a cam follower; and FIG. 6 is a sectional view, taken generally along the line 6—6 of FIG. 5, and illustrating the interaction between a pinion and rack gear teeth formed on the rotatable drive member.

DESCRIPTION OF SPECIFIC PREFERRED EMBODIMENTS OF THE INVENTION

A variable ratio steering apparatus 10 constructed in accordance with the present invention is illustrated in FIG. 1. The steering apparatus 10 is connected with a pair of steerable wheels (not shown) of a vehicle in a well known manner by a suitable linkage. This linkage includes a tie rod 12 connected with one of the steerable vehicle wheels and a second tie rod 14 connected with the other steerable wheel. The two tie rods 12 and 14 are connected with opposite ends of a longitudinally extending force transmitting member or bar 16 by a pair of ball joints 18 and 20. Upon axial movement of the bar 16 relative to a housing 24, the steerable wheels of the vehicle are turned to effect a desired steering action.

In accordance with a feature of the present invention, a tubular drive member or sleeve 28 is rotatably mounted on a central portion of the bar 16 and can be rotated without rotating the bar 16. To this end a bearing assembly 30 is disposed between a cylindrical inner surface of the drive member 28 and the bar 16. The bearing assembly 30 cooperates with a needle bearing assembly 34 to rotatably support the drive member 28 on the bar 16 in a coaxial relationship with the bar. The bearing assembly 30 is effective to hold the drive member 28 against axial movement relative to the bar 16.

A longitudinally extending array 38 of helical rack gear teeth 40 is formed on the drive member 28 (see FIGS. 1 and 2). The rack gear teeth 40 extend only part way around the cylindrical outer surface of the drive member 28 and are disposed in meshing engagement with a rotatable pinion gear 42. Upon rotation of the pinion gear 42 about its central axis in response to turning of a steering wheel, the pinion gear 42 and rack gear teeth 40 cooperate to cause the drive member 28 and bar 16 to be moved along their common central axis 46. This effects turning movement of the steerable vehicle wheels in a known manner.

It is contemplated that during parking and other low speed operations in which the vehicle wheels are sharply turned, it may be desirable to decrease the effort required to turn the vehicle wheels by increasing the steering gear ratio. In order to increase the steering gear ratio, the drive member 28 is rotated about its central axis 46. This is accomplished by the interaction between a cam track 50 (FIG. 2) and a follower 52 (FIG. 3).

Rotation of the drive member 28 causes the helical rack gear teeth 40 to slide relative to the helical teeth on the pinion gear 42. This sliding action displaces the drive member 28 longitudinally relative to the housing 24. This longitudinal movement of the drive member 28 is in a direction opposite to the direction in which the drive member is being moved relative to the housing 24 by the pinion gear 42 to thereby increase the steering gear ratio. If the pinion gear 42 is rotated in a counterclockwise direction as viewed in FIG. 2, the drive member 28 and bar 16 move toward the right (as viewed in FIG. 2). During this rightward movement, the follower 52 engages a downwardly (as viewed in FIG. 2) curving end portion 54 of the cam track 50. This rotates the drive member 48 upwardly (as viewed in FIG. 2) or in a clockwise direction (as viewed in FIG. 3).

The helical rack gear teeth 40 extend at an acute angle to the longitudinal central axis 46 of the drive member 28. Therefore, rotation of the drive member 28 about its central axis 46 causes the flanks on the rack gear teeth to effect a sliding or camming action against the flanks of the helical teeth of the pinion gear 42. This camming action moves the drive member toward the left (as viewed in FIG. 2) with a screw type action. This results in a reduction in the rate of rightward (as viewed in FIG. 2) movement of the drive member 28 and bar 16 to thereby effect an increase in the mechanical advantage provided by the steering gear assembly.

Similarly, the pinion is rotated in a clockwise direction (as viewed in FIG. 2) to effect movement of the drive member 28 and bar 16 toward the left (as viewed in FIG. 2). As this occurs, an arcuately upward curing end portion 58 of the cam track 50 engages the cam follower 52 to rotate the drive member 28 downwardly (as viewed in FIG. 2). The resulting interaction between the helical rack and pinion gear teeth reduces the rate of leftward (as viewed in FIG. 2) movement of the drive member 28 and bar 16.

It should be noted that the cam track 50 has a central portion 62 which extends parallel to the longitudinal axis 46 of the drive member 28. Therefore when the cam follower 50 is engaging the central portion 62 of the cam track 50, the cam follower and cam track are ineffective to cause rotation of the drive member 28 relative to the housing 24. Therefore the steering ratio remains constant at this time.

In accordance with another feature of the present invention, the cam track 50 is axially coextensive with the array 38 of rack gear teeth 40. Thus, the oppositely curving end portions 54 and 58 of the cam track 50 are disposed adjacent to axially opposite ends of the array 38 of rack gear teeth. By having the length of the cam track 50 coextensive with the axial length of the array 38 of rack gear teeth 40, the overall length of the drive member 28 is minimized. It is believed that this feature will be particularly advantageous when the steering apparatus 10 is utilized in association with a relatively small or compact vehicle.

In order to maintain solid meshing engagement between the pinion gear 42 and the array 38 of rack teeth 40 during rotation of the drive member 28, the array 38 of rack gear teeth has a curving configuration which is the same as the curving configuration of the cam track 50. Thus, a longitudinally extending edge portion 66 of the array 38 of rack gear teeth has a central portion which extends parallel to the straight central portion 62 of the cam track 50. The opposite ends of the edge portion 66 of the array 38 of rack gear teeth curve in opposite directions in the same manner as do the opposite end portions 54 and 58 of the cam track 50. Accordingly, the edge portion 66 of the array 38 of rack gear teeth is parallel to the longitudinal central axis of the cam track 50. The opposite edge portion of the array 38 of rack gear teeth (not shown) has the same configuration as the edge portion 66. Therefore the array 38 of rack gear teeth has a substantially constant circumferential extent of about 140° about the drive member 28.

In accordance with still another feature of the present invention, the cam follower 52 engages the cam track 50 at a location which is axially aligned with the location at which the pinion gear 42 meshingly engages the rack gear teeth 40 (see FIG. 3). By having the location at which the cam follower 52 engages the cam track 50 axially aligned with the area where the pinion gear 42 meshingly engages the rack gear teeth, the application of torsional loads to the drive member 28 is minimized. In addition, sidewise loads and bending moments applied to the drive member 28 are minimized. If the cam follower 52 engaged the cam track 50 at a location which was axially offset from the location where the pinion gear 42 meshes with the rack gear teeth 40, the forces applied to the drive member 28 by the cam follower 50 would be offset from the forces applied to the drive member by the interaction between the rack and pinion gear teeth. By having these forces aligned with each other so that there are no bending moments tending to twist the drive member about a transverse axis, the loading applied to the support structure for the drive member 28 and the bar 16 is minimized.

The rack gear teeth 40 and the drive member 28 are continuously pressed into meshing engagement with the pinion gear 42 under the influence of a support yoke 70. The support yoke 70 is pressed upwardly against a lower side of the drive member 28 under the influence of a biasing spring 72 (see FIG. 1). It should be noted that the support yoke 70 engages the drive member 28 at a location which is directly opposite from the location where the pinion gear 42 meshingly engages the rack gear teeth 40 so that the gear tooth forces which tend to separate the rack and pinion gears are offset by the support yoke. The cam follower 52 engages the cam track 50 at a location between the support yoke 70 and the area of meshing engagement between the rack and pinion gears.

In the embodiment of the invention illustrated in FIGS. 1–3, an apparatus constructed in accordance with the present invention is utilized to effect turning movement of the steerable wheels of a vehicle. However, it is contemplated that the apparatus could be utilized in environments other than in association with the steerable wheels of a vehicle. For instance, it is contemplated that the apparatus could be utilized to move the traverse slide of a machine tool relative to the bed of the machine tool. An embodiment of the invention particularly adapted for use in association with a machine tool is illustrated in FIGS. 4–6. Since the embodiment of the invention illustrated in FIGS. 4–6 has many components which are generally similar to the components of the embodiment of the invention illustrated in FIGS. 1–3, similar numerals will be utilized to designate the components of FIGS. 4–6, the suffix letter "a" being associated with the embodiment of the invention illustrated in FIGS. 4–6 to avoid confusion.

A drive assembly 10a (FIG. 4) constructed in accordance with the present invention includes a housing 24a which is connected with a bed (not shown) of a machine tool. One end portion of a longitudinally extending force transmitting member or bar 16a is connected with a traverse slide 80 of the machine tool. Upon rotation of a pinion 42a, an array 38a of rack gear teeth 40a on a drive member 28a effects axial movement of the drive member 28a and the bar 16a to thereby move the traverse slide 80.

In order to change the rate at which the slide 80 is moved even though the rate of rotation of the pinion gear 42a remains constant, a follower 52a cooperates with a cam track 50a formed in the drive member 28a. The cam track 50a is axially coextensive with the array 38a of rack gear teeth 40a. In addition, the array 38a of rack gear teeth 40a has longitudinal edge portions which curve in the same manner as does the cam track 50a to provide for meshing engagement between the pinion gear 42a and rack gear teeth 40a upon rotation of the drive member 28a. The drive member 28a is supported for the rotation about the central axis of the bar 16a by bearing assemblies 30a and 34a.

In the embodiment of the invention illustrated in FIGS. 4 through 6, the cam follower 52a engages the cam track 50a at a location which is directly opposite from the location where the pinion gear 42a meshingly engages the rack gear teeth 40a (see FIG. 6). Therefore, axially inward forces applied to the drive member 28a by the pinion gear 42a and cam follower 52a offset each other. It should be noted that in the embodiment of the invention illustrated in FIGS. 4–6, the bar 16a is supported for axial movement relative to the housing 24a by a pair of cylindrical bushings 84 and 86 (see FIGS. 4 and 5).

It is contemplated that the forces to which the drive assembly 10a may be subjected will be relatively large. Therefore, the drive assembly 10a has relatively heavy components which are capable of withstanding these forces. In addition, wear of the cam follower 52a is minimized by rotatably supporting the cam follower 52a in bearings 90 (see FIGS. 4 and 6). This enables the cam follower 50a to be rotated about its central axis under the influence of friction forces applied against a frusto-conical side surface 92 of the cam follower by the sides of the cam track 50a.

Although the rotatable cam follower 50a has been illustrated in FIGS. 4–6, it is contemplated that the cam follower 50 of the embodiment of the invention shown in FIGS. 1–3 could be rotatably supported on bearings similar to the bearings 90 of FIG. 6. In addition, it is contemplated that the force transmitting bar 16 of the embodiment of the invention illustrated in FIGS. 1–3 could be supported for axial movement by a pair of bearing sleeves similar to the bearing sleeves 84 and 86 in the embodiment of the invention shown in FIG. 4. If this was done, the support yoke 70 could be omitted. Omission of the support yoke 70 would enable the cam follower 52 of the embodiment of the invention illustrated in FIGS. 1–3 to be mounted directly opposite from the pinion gear 42 in the manner shown in the second embodiment of the invention (see FIG. 6).

It is also contemplated that it may be desirable, under certain circumstances, to mount the cam track 50 or 50a on the housing 24 or 24a and to mount the cam follower 52 or 52a on the drive member 28 or 28a. If this was done, the interaction between the cam track and the cam follower would be the same as previously described to effect rotation of the drive members 28 and 28a relatively to the longitudinally extending bars 16 and 16a to thereby vary the gear ratio of the apparatus 10 and 10a upon axial movement of the bars 16 and 16a and drive members 28 and 28a.

In view of the foregoing description it is apparent that the present invention relates to a new and improved variable ratio steering apparatus 10 for use in turning a pair of steerable wheels of a vehicle. The apparatus 10 includes a longitudinally extending force transmitting member or bar 16 having opposite end portions which are connected with the wheels of the vehicle. A rotatable drive member 28 is connected with the bar 16. An array 38 of neck gear teeth 40 on the drive member 28 cooperate with a pinion gear 42 which is rotatable to effect axial movement of both the drive member and the longitudinally extending bar 16 to thereby turn the wheels of the vehicle.

Upon axial movement of the bar 16, the drive member 28 is rotated to cause an interaction between the rack and pinion gear teeth. The interaction between the rack and pinion gear teeth varies the rate of axial movement of the drive member 28 and bar 16 to thereby vary the steering ratio. The drive member 28 is rotated by the cooperation between a cam track 50 formed on the drive member and a cam follower 52. The cam track 50 is advantageously made coextensive with the array 38 of rack gear teeth 40 to promote compactness of construction.

Since the cam track 50 and follower 52 cooperate to rotate the drive member 28 relative to the longitudinally extending bar 16, the bar is not rotated. This tends to minimize wear inducing forces at ball joints 18 and 20 disposed at opposite ends of the bar. In addition, wear inducing forces on the steering apparatus 10 tends to be minimized by having the follower 52 engage the cam track 50 at a location on the drive member 28 which is axially aligned with the location where the pinion gear 42 engages the rack gear teeth 40 on the drive member.

Although an apparatus constructed in accordance with the present invention is advantageously utilized to turn the steerable wheels of a vehicle, it is contemplated that the apparatus could be utilized in other environments if desired. For example, the apparatus 10a is used to control the movement of a traverse slide 80 of a machine tool.

Having described specific preferred embodiments of the invention, the following is claimed:

1. An apparatus for use in transmitting force with variable ratio gearing, said apparatus comprising a housing, a rotatable drive member mounted in the housing, said rotatable drive member being displaceable along its axis of rotation and relative to the housing; a rack gear comprising an array of helically formed teeth disposed on said drive member; a rotatable pinion gear mounted in the housing and engaging with the rack gear to effect axial displacement of said drive member upon rotation of the pinion gear; a cam track disposed on said drive member, at least a portion of said cam track being co-extensive with said rack gear in the direction of the axis of rotation of said drive member; follower means disposed in engagement with said cam track for effecting rotational movement of said drive member relative to said pinion gear upon axial displacement of said drive member; each of said rack gear teeth extending only part way around the periphery of the drive member to an extent that the rack gear maintains engagement with the pinion gear throughout the intended rotational movement of the drive member; a side surface disposed on said drive member to be substantially co-extensive with said rack gear and being provided by the part periphery of the drive member into which said rack gear teeth do not peripherally extend, and support means for at least partially supporting said drive member, said support means being mounted by the housing and slidably engaging the side surface substantially in a plane which extends radially of the drive member and which includes the region of engagement between the rack gear and the pinion gear.

2. An apparatus as set forth in claim 1 wherein said cam track includes a linear central portion which extends parallel to the axis of rotation of said drive member and first and second end portions disposed at opposite ends of said central portion, said first and second end portions extending transversely to the axis of rotation of said drive member.

3. An apparatus as set forth in claim 1 wherein at least a portion of said cam track has a longitudinally curved configuration, at least part of said side surface having a curved configuration which is substantially the same as the longitudinally curved configuration of said cam track.

4. An apparatus as set forth in claim 3 wherein at least a portion of said array of rack gear teeth having a curved edge portion with a configuration which is substantially the same as the longitudinally curved configuration of said cam track.

5. An apparatus as set forth in claim 1 wherein said follower means is disposed in engagement with said cam track at a location which is aligned along the axis of rotation of said drive member with the portion of the array of rack gear teeth engaged by said pinion gear and with the portion of said side surface engaged by said support means.

* * * * *